United States Patent [19]
Turner

[11] Patent Number: 5,675,368
[45] Date of Patent: Oct. 7, 1997

[54] LIQUID-CRYSTAL BASED, SINGLE-PASS COLOR PRINTER

[75] Inventor: William D. Turner, Los Angeles, Calif.

[73] Assignee: Xerox Corporation, Stamford, Conn.

[21] Appl. No.: 467,654

[22] Filed: Jun. 6, 1995

[51] Int. Cl.$^6$ ............................................. B41J 2/47
[52] U.S. Cl. ...................................... 347/164; 347/239
[58] Field of Search .................................. 347/164, 239, 347/118, 256, 232, 115; 430/48, 45, 46, 56

[56] References Cited

U.S. PATENT DOCUMENTS

| | | | |
|---|---|---|---|
| 4,810,058 | 3/1989 | Sangyoji et al. | 347/256 |
| 4,899,224 | 2/1990 | Ooba et al. | 347/118 |
| 5,050,001 | 9/1991 | Hatanaka et al. | 347/239 |
| 5,373,313 | 12/1994 | Kovacs . | |

OTHER PUBLICATIONS

Smile® Micro Lens Arrays Brochure, Corning Incorporated, 1992.
Baranowski D., Nana L., Bellman R., and Borelli N., "Photothermal Technique Generates Lens Arrays", Laser Focus World, Nov., 1989.
Micro–Optics Monolithic Lenslet Modules Brochure, United Technologies Adaptive Optics Associates, Jun. 1992.
Catalog of Standard Micro–Optical Devices, United Technologies Adaptive Optics Associates, Jun. 1992.
Lu, S., Kuo, T., Huang, J., and Lin, F., "Bright and Thin LCD Backlights for Monochrome and Color LCDs", pp. 33–36, SID 93 Digest, 1993.
Steemers, H., "Fundamentals of Liquid Crystal Displays", SID Short Course S–3 presented Jun. 12, 1994.
Hammond, T., "Color Printer Modification for Flash Based Copieer," Xerox Disclosure Journal, p. 305, Sep./Oct. 1991.
Hammond, T., "Fax Modification for Flash Based Copier," Xerox Disclosure Journal, p. 307, Sep./Oct. 1991.
Hammond, T., "Hybrid ER Copier", Xerox Disclosure Journal, p. 309, Sep./Oct. 1991.
Hammond, T., "Printer Modification for Flash Based Copier", Xerox Disclosure Journal, p. 311, Sep./Oct. 1991.
Whitehead, L., deVaal, J., "Light–Distribution Methods for Backlighting LDCs", pp. 419–422, SID 92 Digest, 1992.

Primary Examiner—Mark J. Reinhart
Attorney, Agent, or Firm—Oliff & Berridge

[57] ABSTRACT

A printer includes an active matrix liquid crystal display (AMLCD) light valve with a matrix of a plurality of filter elements, a backlight that emits a plurality of wavelengths of electromagnetic energy that correspond to the plurality of filter elements, and a multi-layer photoreceptor that is sensitive to the plurality of wavelengths of electromagnetic energy. The backlight flash exposes the AMLCD light valve. The distinct wavelengths of electromagnetic energy passing through each of the filter elements of the AMLCD light valve are focused onto the surface of the photoreceptor. Each layer of the photoreceptor is sensitive to only one of the distinct wavelengths of electromagnetic energy passing through the filter elements of the AMLCD light valve. Thus, a full color latent image is flash exposed onto the photoreceptor. A very compact lenslet array is used to focus the image onto the photoreceptor. This reduces the overall space requirements of the printer, making it readily suitable for desktop applications.

8 Claims, 5 Drawing Sheets

| C2 | | |
|---|---|---|
| C1 | | |
| C2 | C4 | C2 |
| C1 | C3 | C1 |
| C2 | C4 | C2 | C4 |
| C1 | C3 | C1 | C3 |

| C2 | | |
|---|---|---|
| C1 | | |
| C2 | C1 | C2 |
| C1 | C3 | C1 |
| C2 | C1 | C2 | C1 |
| C1 | C3 | C1 | C3 |

LIQUID-CRYSTAL BASED, SINGLE-PASS COLOR PRINTER

BACKGROUND OF THE INVENTION

1. Field of the Invention

This invention relates in general to color printers and, in particular, to single-pass color printers using a two-dimensional, full frame active matrix liquid-crystal display light valve for flash exposing a multiple layer photoreceptor.

2. Background of the Related Art

In xerographic printing, a latent image is formed on a charged photoreceptor, usually by raster sweeping a modulated laser beam across the photoreceptor. The latent image is then electrostatically developed using toner. The developed image is then transferred and fused to create a permanent image on a recording medium. While other methods are known, the most common method to raster sweep the laser beam is to deflect the laser beam from a rotating polygonal mirror. The multi-faceted, rotating polygon mirror has a set of related optics and can sweep one or more beams simultaneously. A rotating polygon mirror and its related optics are generally referred to as a raster output scanner (ROS). Printers that sweep several beams simultaneously are referred to as multi-beam ROS printers.

Digital data which is supplied to the laser printer is used to modulate the laser beam. The beam is raster scanned onto the photoreceptor surface in a lineby-line fashion. As the laser beam sweeps across the surface in a "scan direction", the photoreceptor moves in a perpendicular direction (the "process direction").

Although ROS printers are successful in the marketplace, one limitation of ROS printers is printing speed or throughput. The maximum print speed of a ROS printer is limited by the maximum speed at which the laser beam can be swept across the surface of the photoreceptor. A number of factors contribute to the maximum scan speed. One such factor includes the maximum rotational speed of the rotating polygonal mirror which deflects the beam to produce the scan sweep. As a result, the current maximum throughput of a single beam ROS printer is approximately 200 pages per minute.

Another limitation of ROS printers is the need for precision. Perfect synchronization between the photoreceptor and the raster scan beam must be kept throughout the entire image writing process. Any deviation is generally noticeable to the human eye, which is highly sensitive to misregistration errors.

Another limitation arises due to the relative motion that occurs between the input document and the linear scanning bar generating the digital print data. This relative motion occurs when the document is passed over the linear scanning bar or if the bar is moved over the length of the document. In either case, exacting mechanical precision is required to accurately capture the image of the entire document. Any deviation in motion control may cause visual effects in the final hard copy printout that are noticeable to the human eye. Moreover, relative motion problems can be exacerbated when using very high throughput rates.

A method of digital printing that eliminates relative motion control problems has been described in articles by Thomas Hammond entitled: "Hybrid ER Copier", "Printer Modification for Flash Based Copier", "Color Printer Modification for Flash Based Copier" and "Fax Modification for Flash Based Copier", published in Xerox Disclosure Journal (XDJ) Vol. 16, No. 5, September/October 1991, at pages 309, 311, 305 and 307, respectively.

The digital printer described in "Printer Modification for Flash Based Copier" uses a reflective full-frame liquid-crystal display (LCD) as a front end image projector for a flash-based copier. In the article, Hammond positions the LCD over the platen of the copier to allow the LCD to provide an input image to the copier. To print, digital data is then loaded into the LCD and the copier flash exposes the image displayed on the LCD to form the latent image on the photoreceptor.

In conventional xerographic printers, a separate latent image for each color separation layer is required. For example, a four-color printer uses 4 different color separation layers, one for each of the four system colors used by the four-color printer. Color prints are conventionally produced by sequentially transferring each color separation layer image onto an intermediate transfer belt. The intermediate transfer belt is passed over the photoreceptor once for each color separation layer. This builds up the full color image by overlapping the color separation layer images. The built-up image is then transferred to a recording medium. Such printers are called multiple-pass printers.

Several useful methods are known for making copies having plural colors. Some of these methods make high quality images. However, there is need for improvement. In particular, it is desirable to be able to print images having two or more highlight colors, rather than being limited to a single highlight color. It is also desirable to be able to produce such images in a single pass of the photoreceptor or other charge retentive surface past the printing process areas or stations.

One method of producing images in plural is disclosed in U.S. Pat. No. 5,373,313 to G. J. Kovacs, assigned to the same assignee as this invention, and incorporated herein by reference. In Kovacs, a single-pass, multiple color xerographic printing system has a single polygon, single optical system, raster output scanning (ROS) system. This single-pass, multiple color ROS printer has a multiple beam, multiple wavelength laser diode source for the ROS, which images the multiple beams at a single station to form closely spaced spots on a multiple layer photoreceptor. Each photoreceptor layer is sensitive or accessible to only one of the multiple wavelengths. However, the single-pass, multiple color ROS printer is still limited by the rotation speed of the polygon mirror.

With the increase in demand for image manipulation and processing, there is a need to provide a color singlepass, multiple printer that tightly couples image capture and image exposure. Additionally, there is a need for a digital imager that can synchronize these functions at electronic speeds to increase the printer throughput.

SUMMARY OF THE INVENTION

This invention therefore provides an imaging system capable of capturing a complete image digitally, while simultaneously eliminating motion control problems associated with image capture and exposure.

This invention also provides an imaging system that electronically couples capturing an original color image and exposing the color image onto a surface of a photoreceptor.

In one embodiment of the invention, a document is flash exposed to illuminate the image. The complete image on the document is captured by a full-frame, twodimensional sensor array. The sensor array then outputs the digital image data. The digital image data can be stored and/or electronically procured or manipulated. The digital image data is then output to an active matrix liquid crystal display (AMLCD)

light valve. The pattern image formed on the AMLCD light valve is then flash exposed onto a multiple-wavelength-sensitive photoreceptor by flashing a backlight emitting electromagnetic energy having a plurality of wavelengths. An electronic subsystem (ESS) provides for synchronous control of the imaging system. The electromagnetic energy passing through filter elements of the AMLCD light valve is focused onto the surface of the multi-layer photoreceptor. Each layer of the photoreceptor is sensitive to, or accessible to, only one wavelength of multiple-wavelength electromagnetic energy passing through the AMLCD light valve. Thus, a full, latent multiple-color image is simultaneously formed on the surface of the photoreceptor.

In a second embodiment of the invention, the imaging system uses a compact lens array to focus the image onto the photoreceptor. This reduces the overall space requirements of the single pass, multiple color printer, making it readily suitable for desktop applications.

These and other aspects and advantages of the invention are described or apparent from the following detailed description of the preferred embodiments.

BRIEF DESCRIPTION OF THE DRAWINGS

The preferred embodiments are described with reference to the drawings in which.

DETAILED DESCRIPTION OF THE PREFERRED EMBODIMENTS

Figure 1:
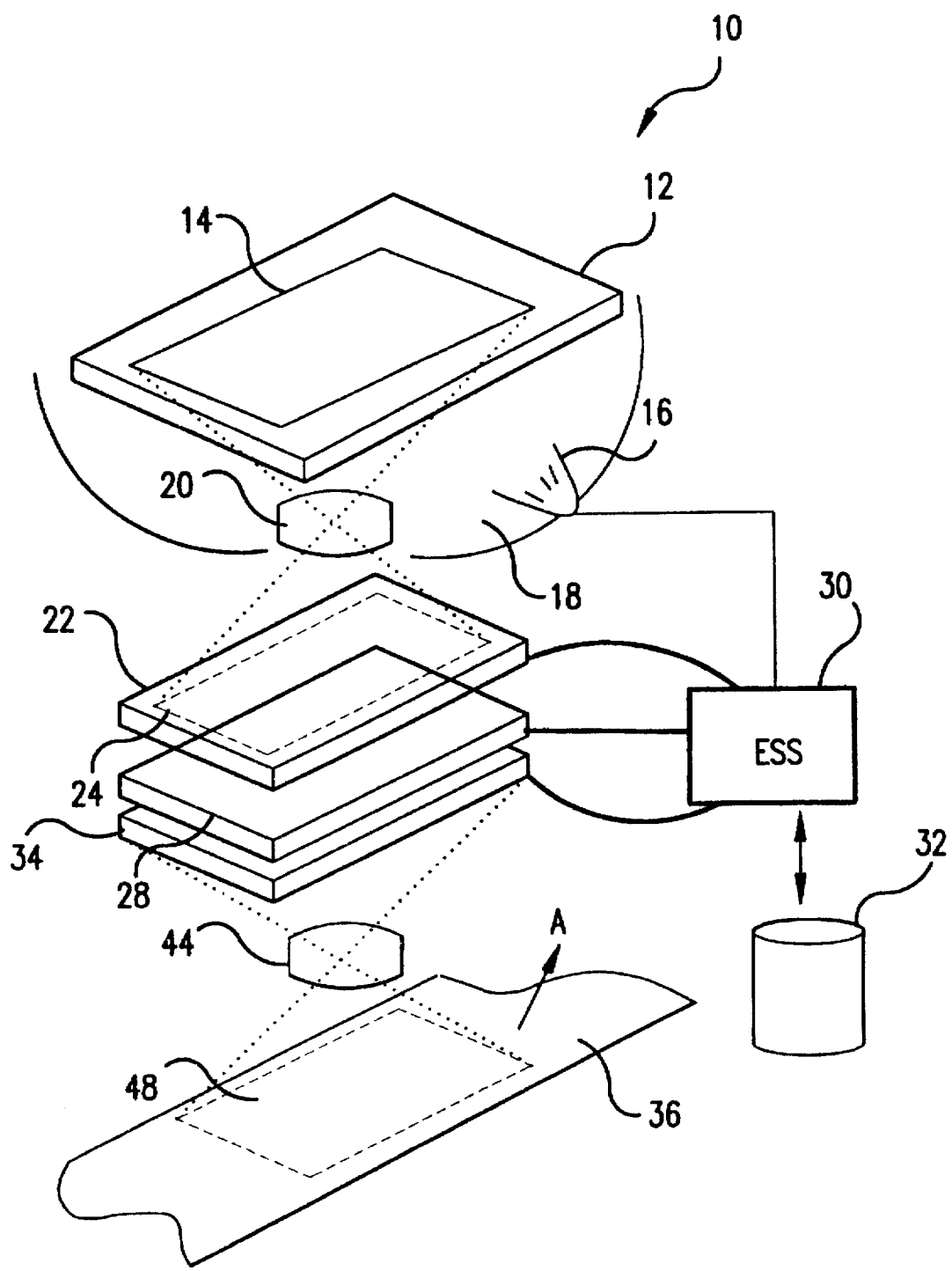
FIG. 1 is a perspective view of a first preferred embodiment of the invention.

FIG. 1 shows a first preferred embodiment of the invention. As shown in FIG. 1, a printer 10 comprises a transparent platen 12 on which a document 14 is supported. The document 14 has an image that is illuminated by a flash lamp 16. The flash lamp 16 illuminates the document 14 with a relatively intense, short duration flash of light. The light can be contained and further dispersed within an integrating cavity 18 to fully and evenly illuminate the document 14. The light reflected from the image on the document 14 is focused by an optic system 20 onto a twodimensional sensor array 22. The image on the document 14 projected onto the sensor array 22 is represented by the dotted area 24.

It should be appreciated that any full frame, twodimensional sensor array 22 can be used in this invention. Many such sensors are well known to those skilled in the art. Preferably, the sensor array 22 is at least a twocolor CCD array.

One such sensor array 22 is discussed in U.S. Pat. No. 4,660,095 to Cannella et al., which is incorporated herein by reference. Cannella et al. describes a contact-type sensor array on which a document rests. In Canella, a backlight is used to illuminate the document through the sensor array and the light reflected from the document is sensed by the sensor array.

In addition, a contact, wedge-shaped scanner incorporating a sensor array is described in commonly assigned U.S. patent application Ser. No. 08/158,676, filed on Nov. 29, 1993, and entitled "Wedge Scanner Utilizing Two-Dimensional Sensing Arrays" which is incorporated herein by reference.

As shown in FIG. 1, once the image is captured by the sensor array 22, digital image data is read out from the sensor array 22 and is input to an electronic subsystem (ESS) 30. The ESS 30 can comprise a controller, such as a microprocessor-controlled computer and peripherals, and control software responsive to user or system demands for processing manipulating, storing and routing the digital image data. In the ESS 30, the digital image data may either undergo further image processing or it may be stored in an optional storage 32. Optional storage 32 may be, for example, a RAM, a flash memory, a floppy disk, an optical disk or some other type of magnetic or optical storage media.

As shown in FIG. 1, the ESS 30 is coupled to and controls the flash lamp 16, the sensor array 22, a backlight 28, an AMLCD light valve 34 and the optional storage memory 32. The ESS 30 drives all the abovementioned components for synchronous function. The ESS 30 allows the flash exposure of document 14 only if the sensor array 22 is ready to accept image data. Similarly, the ESS 30 allows the flash exposure of the photoreceptor surface by the backlight only if the AMLCD light valve 34 is ready.

Additionally, the ESS 30 synchronizes the flow of the digital image data from the sensor array 22 to the AMLCD light valve 34. This flow is allowed only if the AMLCD light valve 34 is ready to accept the digital image data. It should be appreciated that other methods can be used to synchronously control these elements. For example, the flash lamp 16 and the backlight 28 can have separate controllers that control their operation according to some predefined timing pattern.

The digital image data can be input to the AMLCD light valve 34 directly from the sensor array 22, from the ESS 30, or from the optional storage 32 via ESS 30. Further, the optional storage 32 can store the digital image data for printout at some later time.

It should be appreciated that the digital image data can be input from the host computer, the LAN or the like through the I/O interface, rather than by exposing the document 14.

It should also be appreciated that the ESS 30 will generally comprise a controller, ROM and RAM memories, a user interface, and can include a non-volatile storage memory 32 and an I/O interface to allow the ESS 30 to be connected to a host computer, a LAN or the like. The ESS 30 controller can be a general purpose computer, a special purpose computer, an ASIC, handwired circuitry or the like.

Once the AMLCD light valve 34 has been set according to the digital image data, a backlight 28 is controlled by the ESS 30 to produce a momentary, intense flash of electromagnetic energy having a plurality of wavelengths, each wavelength having a sufficient intensity to pass through the AMLCD light valve 34 and expose a multi-layer photoreceptor 36.

In this first preferred embodiment, each wavelength of electromagnetic energy passing through the AMLCD light valve 34 is focused by the optic system 44 onto the surface of the photoreceptor 34 to form the latent image 48. It should be appreciated that the optic system 44 can be any suitable combination of optic elements. The optic system 44 can be, for example, a combination of lenses, apertures, mirrors and other optic elements capable of focussing the plurality of wavelengths of electromagnetic energy passing through the AMLCD light valve 34 onto the surface of the photoreceptor 36.

Figures 2, 3, 4:
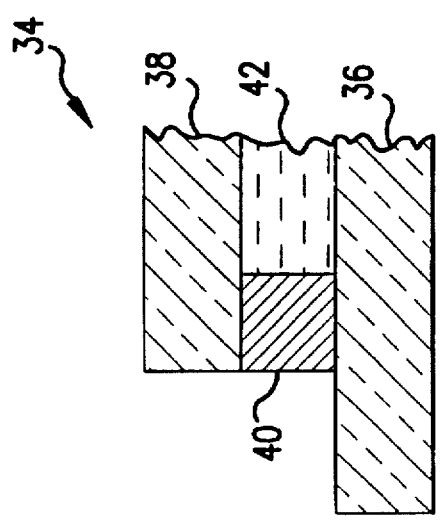
FIG. 2 is a cross-sectional side view of the AMLCD light valve.
FIG. 3 is a perspective view of the matrix of filter elements.
FIG. 4 is a perspective view of the matrix of filter elements.

FIG. 2 shows a cross-sectional view of the AMLCD light valve 34. The AMLCD light valve 34 includes an active matrix sheet 36, a cover sheet 38, spacers 40 and liquid crystal material 42. The sheets 36 and 38 and the spacers 40 define a container for the liquid crystal material 42. The cover sheet 38 includes a matrix of a plurality of filter elements, which are patterned on its substrate and are covered by a passivation layer of clear polyamide and patterned ITO electrodes (not shown).

As shown in FIGS. 3 and 4, the matrix of filter elements can be arranged on the substrate of the cover sheet 38 in a variety of ways. For example, FIG. 3 shows a two-dimensional array cells, each cell having one of four different filters. Each filter $C_1$–$C_4$ permits a different wavelength of the multiple-wavelength electromagnetic energy emitted by the backlight 28 to pass through to the photoreceptor 36.

As shown in FIG. 3, the filters $C_1$–$C_4$ are arranged so that each filter appears in an equal number of cells, i.e., that each filter $C_1$–$C_4$ has the same resolution. In addition, as shown in FIG. 3, the filters $C_1$–$C_4$ are arranged so that each two-by-two matrix of cells contains one of each of the four filter elements, $C_1$, $C_2$, $C_3$ and $C_4$.

FIG. 4 shows an alternative arrangement of the filter elements $C_1$–$C_3$ on the cover sheet 38. In this arrangement, only three filter elements, $C_1$, $C_2$ and $C_3$ are used. One filter element, for example, $C_1$ has a higher resolution than the other filter elements $C_2$ and $C_3$. Similar to the four filter element arrangement of FIG. 3, each of the three filter elements $C_1$, $C_2$ and $C_3$ allows only one wavelength $\lambda_1$, $\lambda_2$ or $\lambda_3$, of the multiple wavelength electromagnetic energy emitted from the backlight 28 to pass through the AMLCD light valve 34 and onto the surface of the photoreceptor 36.

It should be appreciated that although this invention uses any suitable AMLCD light valve or output display, it is desirable to use a light valve or display having the highest possible resolution. For example, one such suitable AMLCD light valve is a 13" diagonal, 6.3 million pixel AMLCD light valve developed by Xerox Corporation, and described in commonly assigned U.S. patent application Ser. No. 08/235, 011, filed on Apr. 28, 1994, Attorney Docket No. D/94179, entitled "Thin-Film Structure With Dense Array of Binary Control Units Representing Images", which is incorporated herein by reference.

Figure 5:
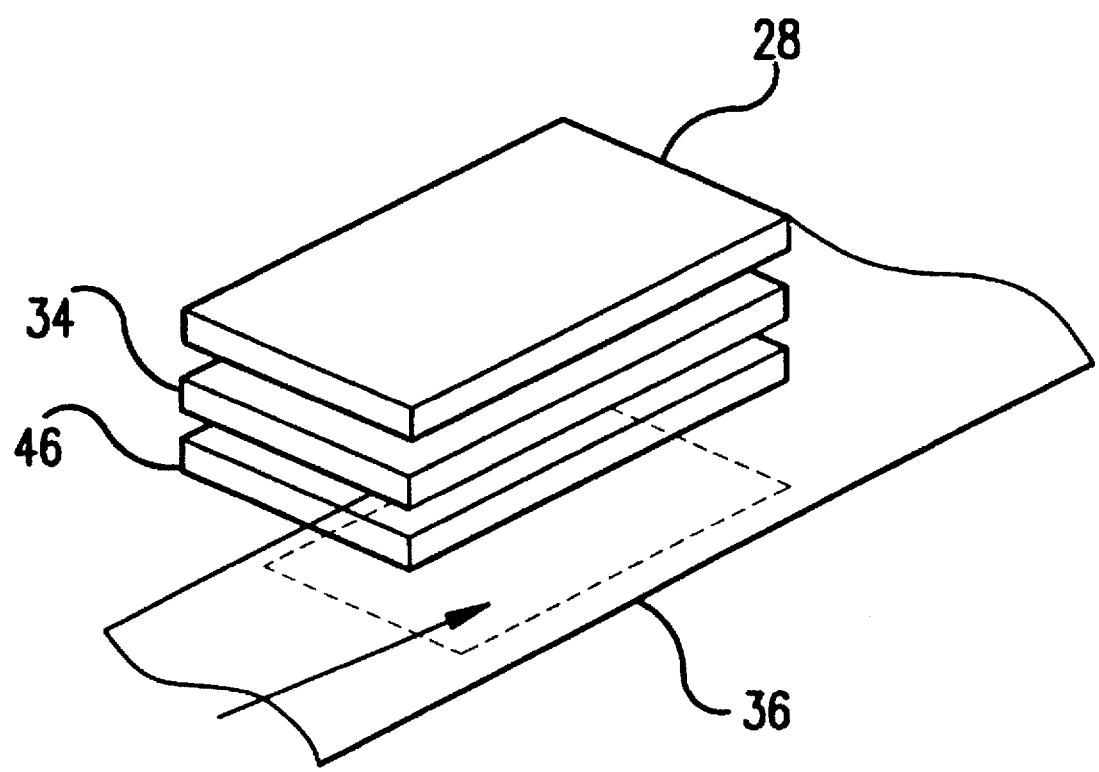
FIG. 5 is a perspective view of the lenslet array of a second preferred embodiment of this invention.

FIG. 5 shows a second preferred embodiment of the imaging system of printer 10. As shown in FIG. 5, optic system 44 of the first preferred embodiment is replaced by a lenslet array 46. Using the lenslet array 46 instead of the optic system 44 permits the space requirements to be reduced. For example, the optic system 44 can require up to three feet of optical path between the AMLCD 34 and the photoreceptor 36. In contrast, the lenslet array 46 requires only three inches. It should be appreciated that lenslet arrays are well known in the art and are commercially available from Corning under the trademark SMILE or Nippon Sheet Glass under the trademark SELFOC.

Figure 6:
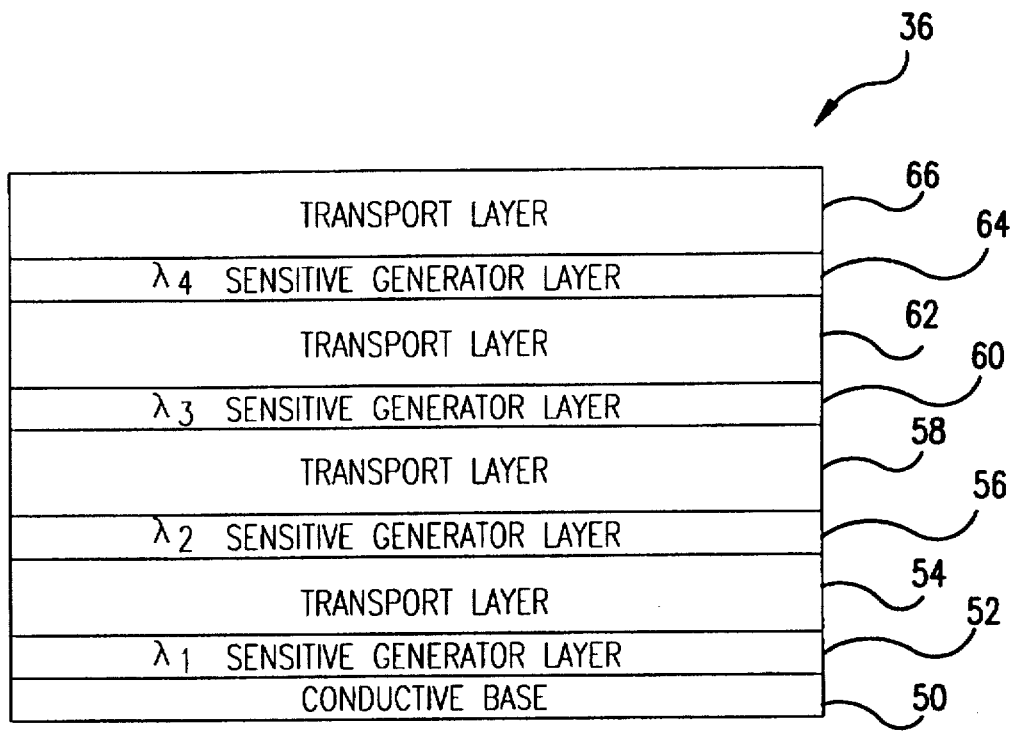
FIG. 6 is a cross-sectional side view of the multi-layer photoreceptor.

FIG. 6 shows a cross-sectional side view of the multi-layer photoreceptor 36. The photoreceptor 36 comprises a flexible, electrically conductive base layer 50 and four photoreceptive layers. Each photoreceptor layer has a charge generator layer and a charge transport layer. The conductive base layer 50 can have any effective thickness and is typically between 6 µm to 250 µm, and is preferably between 50 µm to 200 µm. Each generator layer is approximately 0.1 µm to 1 µm thick and each transport layer is approximately 15 µm thick.

The first photoreceptor layer, formed on the conductive base 50, comprises a generator layer 52 and a transport layer 54. The second photoreceptor layer comprises a generator layer 56 and a transport layer 58. The third photoreceptor layer comprises a generator layer 60 and a transport layer 62. The fourth photoreceptor layer comprises a generator layer 64 and a transport layer 66.

Each generator layer 52, 56, 60 and 64 is sensitive to only one of the wavelengths, $\lambda_1$, $\lambda_2$, $\lambda_3$ or $\lambda_4$, passing through the corresponding filter element $C_1$, $C_2$, $C_3$ or $C_4$ of the AMLCD light valve 34. Each generator layer 52, 56, 60 and 64 is transparent to the other wavelengths.

For example, the generator layer 52 is sensitive to the wavelength $\lambda_1$ passing through the filter element $C_1$ of the AMLCD light valve 34. Similarly, generator layers 56, 60 and 64 are sensitive to the wavelengths, $\lambda_2$, $\lambda_3$ and $\lambda_4$ passing through the filter elements C2, C3 and C4 of the AMLCD light valve 34, respectively.

Figure 7:
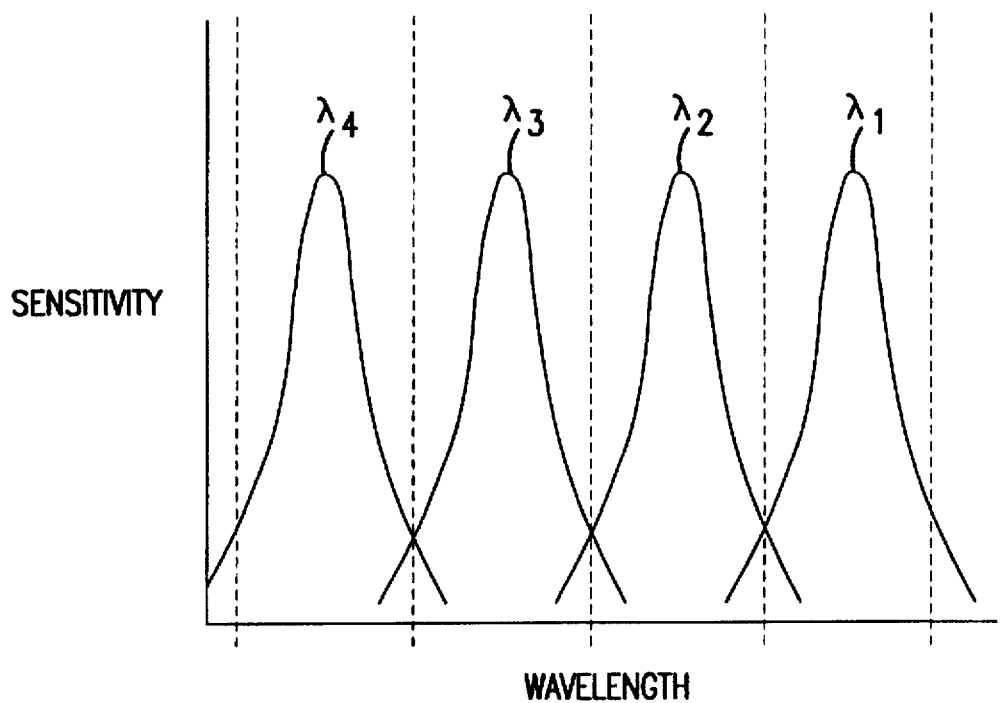
FIG. 7 is a graph of the multi-layer photoreceptor sensitivity as a function of wavelength.

The sensitivity of each generator layer 52, 56, 60 and 64 of the photoreceptor 36 is distinct from the sensitivity of the other generator layers. Likewise, as shown in FIG. 7 each of the wavelengths $\lambda_1$, $\lambda_2$, $\lambda_3$ and $\lambda_4$ are distinct from the other wavelengths. In order to form the proper latent color separation image in the appropriate generator layer 52, 56, 60 or 64 of the photoreceptor 36, the sensitivity of each photoreceptor layer 52, 56, 60 and 64 must be well separated and each generator layer 52, 56 60 and 64 must be sensitive to a narrow range of wavelengths centered on the wavelengths $\lambda_1$, $\lambda_2$, $\lambda_3$ and $\lambda_4$, respectively. Thus, the spectral sensitivity of each layer 52, 56, 60 and 64 of the photoreceptor 36 should be matched as closely as possible to the wavelengths $\lambda_1$, $\lambda_2$, $\lambda_3$ and $\lambda_4$ emitted by the backlight 28 and passing through the respective filter elements $C_1$, $C_2$, $C_3$ and $C_4$ of the AMLCD light valve 34.

It should be understood that any one of the generator layers 52, 56, 60 and 64 in the photoreceptor 36 can be sensitive to any one of the wavelengths, $\lambda_1$, $\lambda_2$, $\lambda_3$ and $\lambda_4$. Further, it should be appreciated that this invention is applicable to any number of photoreceptor layers having sensitivities matched to the wavelengths emitted by the backlight 28. Thus, the multi-layer photoreceptor of this invention is not limited to a multilayer photoreceptor having four layers, but may have three layers as discussed above, or any other number of layers.

Figure 8:
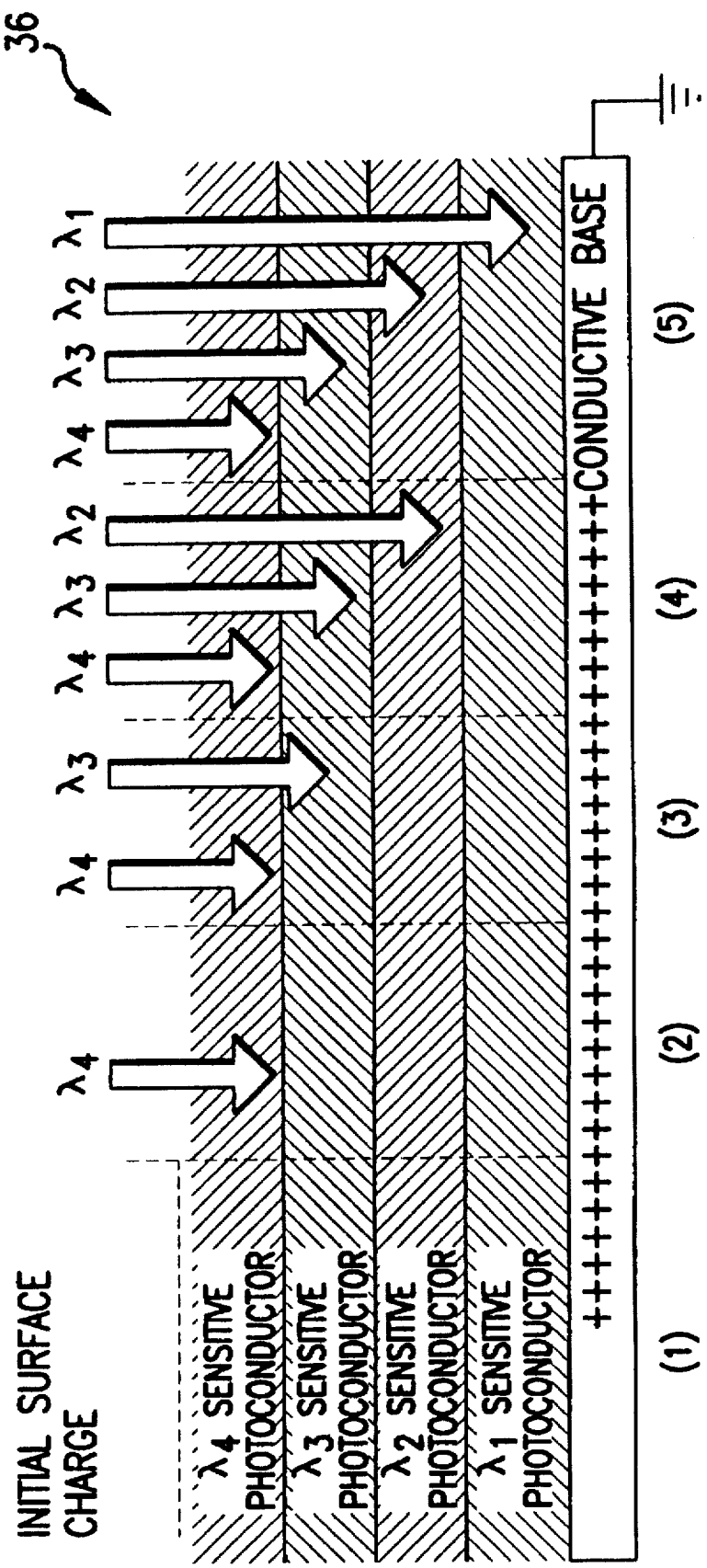
FIG. 8 is a side view of the multi-layer photoreceptor with five different levels of discharge.

The voltage at the surface of the multi-layer photoreceptor 36 is discharged to different levels depending on the number of layers exposed by the image displayed on the AMLCD light valve 34. As shown in FIG. 8, for a multi-layer photoreceptor 36 having four layers, for example, there are five different levels of discharge. When none of the layers have been exposed by the AMLCD light valve 34, the photoreceptor surface voltage is 1200 V. When only the top layer has been exposed by the AMLCD light valve 34 to the wavelength $\lambda_1$, the photoreceptor surface voltage is 900 V. When both of the two top layers have been exposed by the AMLCD light valve 34 to the wavelengths $\lambda_1$ and $\lambda_2$, the photoreceptor surface voltage is 600 V. When the three top layers have been exposed by the AMLCD light valve 34 to the wavelengths $\lambda_1$, $\lambda_2$ and $\lambda_3$, the photoreceptor surface voltage is 300 V. When all of the four layers have been exposed by the AMLCD light valve 34 to the wavelengths $\lambda_1$, $\lambda_2$, $\lambda_3$ and $\lambda_4$, the photoreceptor surface voltage is fully discharged, i.e. 0 V.

After the layers of the photoreceptor 36 are exposed by passing the electromagnetic energy emitted by the backlight 28 through the AMLCD light valve 34 to form the latent image successively for each color, the full color image is developed using, in this example, a four color development process. The four color development process can be done in many ways. For example, a four color development with a subtractive color scheme is described in U.S. Pat. No. 5,373,313 to G. J. Kovacs, assigned to the same assignee as this invention, and incorporated herein by reference.

In the four color development with the subtractive color scheme, cyan, magenta, yellow and black (C, M, Y, K) toners are used. The development scheme must be able to deposit up to two toner colors in any given pixel. Depositing three colors, cyan, magenta and yellow (C, M and Y) is replaced by depositing black (K) toner only. An appropriate combination of toner polarities, development biases and intermediate steps must be used. In choosing these combinations, identical photoreceptor surface voltages must be used to achieve several different combinations of color exposures. It should be understood that the four color development process should not be limited to any particular development process.

While this invention has been described in conjunction with specific embodiments, it is evident that many alternatives, modifications and variations will be apparent to those skilled in the art. Accordingly, the preferred embodiments of this invention as set forth herein are intended to be illustrative, rather than limiting. Various changes may be made without departing from the spirit and scope of this invention as defined in the following claims.

What is claimed is:

1. A printer for imaging a digital data signal, comprising:

a backlight for emitting a plurality of distinct wavelengths of electromagnetic energy;

a photoreceptor having a plurality of active layers, each active layer being sensitive to only one of the plurality of the distinct wavelengths of electromagnetic energy emitted from the backlight; and an active matrix liquid crystal display for forming an image pattern in response to the digital data signal, the active matrix liquid crystal display positioned between the backlight and the photoreceptor and comprising a matrix of display cells, each cell having one of a plurality of filters, each filter transmitting one of the plurality of the distinct wavelengths of electromagnetic energy emitted by the backlight, wherein, when the active matrix liquid crystal display forms the image pattern and the backlight emits the plurality of distinct wavelengths of electromagnetic energy, a latent image is formed on the photoreceptor.

2. The printer of claim 1, further comprising a focusing system positioned between the active matrix liquid crystal display and the photoreceptor and capable of focusing the plurality of the distinct wavelengths of electromagnetic energy emitted from the backlight onto the photoreceptor.

3. The printer of claim 2, wherein the focusing system comprises a lenslet array.

4. A printer for imaging a digital data signal, comprising:

emitting means for emitting a plurality of distinct wavelengths of electromagnetic energy;

photoreceptor means having a plurality of active layers, each active layer being sensitive to only one of the plurality of the distinct wavelengths of electromagnetic energy emitted from the backlight; and display means for forming an image pattern in response to the digital data signal, the display means positioned between the emitting means and the photoreceptor means and comprising a matrix of display cells, each cell having one of a plurality of filters, each filter transmitting one of the plurality of the distinct wavelengths of electromagnetic energy emitted by the emitting means, wherein, when the display means forms the image pattern and the emitting means emits the plurality of distinct wavelengths of electromagnetic energy, a latent image is formed on the photoreceptor means.

5. The printer of claim 4, further comprising a focusing means positioned between the display means and the photoreceptor means and capable of focusing the plurality of the distinct wavelengths of electromagnetic energy emitted from the emitting means onto the photoreceptor means.

6. The printer of claim 5, wherein the focusing means comprises a lenslet array.

7. An imaging system, comprising:

a light source for illuminating a document;

a two-dimensional sensor array for capturing light reflected from the document to form digital image data;

an active matrix liquid crystal display for forming an image pattern in response to the digital image data, the active matrix liquid crystal display comprising a matrix of display cells, each cell having one of a plurality of filters;

a backlight positioned between the twodimensional sensor array and the active matrix liquid crystal display for emitting a plurality of distinct wavelengths of electromagnetic energy, each distinct wavelength of electromagnetic energy emitted by the backlight transmitting through only one of the plurality of filters;

a photoreceptor having a plurality of active layers, each active layer being sensitive to only one of the plurality of the distinct wavelengths of electromagnetic energy emitted from the backlight; and a focusing system positioned between the active matrix liquid crystal display and the photoreceptor for focusing the plurality of the distinct wavelengths of electromagnetic energy emitted from the backlight to form a latent image on the photoreceptor.

8. The imaging system of claim 7, wherein the focusing system comprises a lenslet array.

* * * * *